(12) United States Patent
Johann et al.

(10) Patent No.: US 9,428,956 B2
(45) Date of Patent: Aug. 30, 2016

(54) DRIVE ARRANGEMENT

(71) Applicant: Dr. Ing. h.c. F. Porsche Aktiengesellschaft, Stuttgart (DE)

(72) Inventors: Michael Johann, Tamm (DE); Rainer Hilt, Saarlouis (DE); Jonas Kirchner, Marktheidenfeld (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/619,282

(22) Filed: Feb. 11, 2015

(65) Prior Publication Data
US 2015/0226000 A1 Aug. 13, 2015

(30) Foreign Application Priority Data

Feb. 12, 2014 (DE) .................. 10 2014 101 697

(51) Int. Cl.
*B60J 1/08* (2006.01)
*E06B 9/70* (2006.01)
*B60J 11/08* (2006.01)
*E06B 9/68* (2006.01)
*B60J 1/20* (2006.01)

(52) U.S. Cl.
CPC ............... *E06B 9/70* (2013.01); *B60J 1/2022* (2013.01); *B60J 1/2086* (2013.01); *B60J 11/08* (2013.01); *E06B 9/68* (2013.01); *E06B 2009/6809* (2013.01)

(58) Field of Classification Search
CPC .............................. B60J 1/2022; B60J 1/2086
USPC ...................... 160/370.22, 265, 188; 49/349; 74/424.74
See application file for complete search history.

(56) References Cited

U.S. PATENT DOCUMENTS

| 2,919,911 | A | * | 1/1960 | Furtah, Jr. | ............. | E05F 15/689 49/349 |
| 3,141,663 | A | * | 7/1964 | Voiles | ................... | E05F 11/405 49/334 |
| 3,156,132 | A | * | 11/1964 | Borie, Jr. | ............ | F16H 25/2204 74/424.74 |
| 4,074,463 | A | | 2/1978 | Colanzi | | |
| 4,186,524 | A | | 2/1980 | Pelchat | | |
| 5,680,728 | A | | 10/1997 | Moy | | |

(Continued)

FOREIGN PATENT DOCUMENTS

DE           26 37 438          2/1978
DE    10 2012 100 472           7/2013

(Continued)

OTHER PUBLICATIONS

German Search Report of Sep. 22, 2014.

*Primary Examiner* — David Purol
(74) *Attorney, Agent, or Firm* — Gerald E. Hespos; Michael J. Porco; Matthew T. Hespos

(57) ABSTRACT

A drive arrangement (1) for actuating a roller sun blind (21) of a motor vehicle has an actuation rod (2) with external thread (3) and a hollow cylinder (4) with internal thread (5). The actuation rod (2) is arranged coaxially in the hollow cylinder (4). The external thread (3) of the actuation rod (2) meshes with the internal thread (5) of the hollow cylinder (4). Thus, relative rotation of actuation rod (2) and hollow cylinder (4) displaces the actuation rod (2) axially relative to the hollow cylinder (4). The actuation rod (2) is guided in non-rotatable fashion, and the hollow cylinder (4) can be rotated by a drive (6).

8 Claims, 2 Drawing Sheets

(56) References Cited

U.S. PATENT DOCUMENTS

| | | |
|---|---|---|
| 6,086,133 A | 7/2000 | Alonso |
| 6,095,231 A | 8/2000 | Hahn |
| 6,779,307 B2 | 8/2004 | Dobson |
| 8,052,818 B2 | 11/2011 | Fenger |

FOREIGN PATENT DOCUMENTS

| | | |
|---|---|---|
| JP | 679984 | 11/1994 |
| KR | 1020080091138 | 10/2008 |

* cited by examiner

DRIVE ARRANGEMENT

CROSS REFERENCE TO RELATED APPLICATION

This application claims priority under 35 USC 119 to German Patent Appl. No. 10 2014 101 697.1 filed on Feb. 12, 2014, the entire disclosure of which is incorporated herein by reference.

BACKGROUND

1. Field of the Invention

The invention relates to a drive arrangement for the adjustment of a roller sun blind of a window of a motor vehicle. In this case, the expression "roller sun blind" is used representatively for a shading apparatus for shading an interior compartment against solar radiation, for example, or for shielding the interior compartment from view from the outside.

2. Description of the Related Art

Known roller blinds for windows of motor vehicles are adjustable between a first position that allows an unobstructed view through the window and a second position that protects the interior compartment of the motor vehicle against overly intense solar radiation. Adjustments to intermediate positions between the first and second positions also are possible.

U.S. Pat. Nos. 6,095,231 and 6,086,133 disclose drive arrangements where roller sun blinds are actuated by two drive arrangements connected respectively to the opposite ends of the roller sun blind. Ends of these roller sun blinds have threaded bushings that engage threaded rods of the drive arrangements engage. Thus, the threaded bushings displace axially when the threaded rods are rotated and the roller sun blind can thus be raised or lowered. This system is complex due to the separate drive arrangements at the opposite ends of the roller sun blind to actuate a roller sun blind.

It is therefore the object of the invention to provide a drive arrangement that is simplified, but nevertheless permits reliable actuation of a roller sun blind.

SUMMARY OF THE INVENTION

The invention relates to a drive arrangement for actuating a roller sun blind of a motor vehicle. The drive arrangement has an actuation rod with an external thread and a hollow cylinder with an internal thread. The actuation rod is arranged coaxially in the hollow cylinder. The external thread of the actuation rod meshes with the internal thread of the hollow cylinder so that the actuation rod is displaced axially relative to the hollow cylinder in response to a relative rotation of actuation rod and hollow cylinder. The actuation rod is guided non-rotatably, and the hollow cylinder can be rotated by a drive. In this way, the drive can be arranged in variable fashion relative to the hollow cylinder.

The hollow cylinder may have external toothing for rotatably driving the hollow cylinder. For this purpose, the drive can directly or indirectly drive the external toothing by way of a gearwheel to realize a simple drive connection.

The drive may comprise an electric motor that may have a drive wheel with toothing that drives the external toothing of the hollow cylinder.

A toothed belt may be provided and may loop around the toothing of the hollow cylinder and also around the toothing of the drive wheel of the electric motor to achieve an indirect drive connection. The drive can thus be arranged in a particularly flexible manner.

A belt tensioner with a roller and a spring may be provided. The belt tensioner tensions the looped-around toothed belt by virtue of the spring forcing the roller against the toothed belt. In this way, a toothed belt can be used on a long-term basis even if it becomes stretched.

The hollow cylinder may be mounted rotatably at least at one end region by a sleeve. Thus, mounting the drive arrangement is particularly straightforward and the drive arrangement be accommodated in a door trim panel or in a vehicle door because the sleeves provided for mounting purposes can be positioned and fastened easily.

The hollow cylinder may be mounted rotatably at both end regions by sleeves. This permits simple mounting and placement.

One of the sleeves may have an opening through which the actuation rod can extend. This simplifies fastening and nevertheless permits the actuation of a roller sun blind.

The actuation rod may be flexible. Thus, the actuation rod can adapt to the curvature in a door or of a window.

The actuation rod may comprise a high-grade steel to achieve the required flexibility.

The invention will be explained in detail below on the basis of an exemplary embodiment and with reference to the drawing.

DETAILED DESCRIPTION

Figure 1:
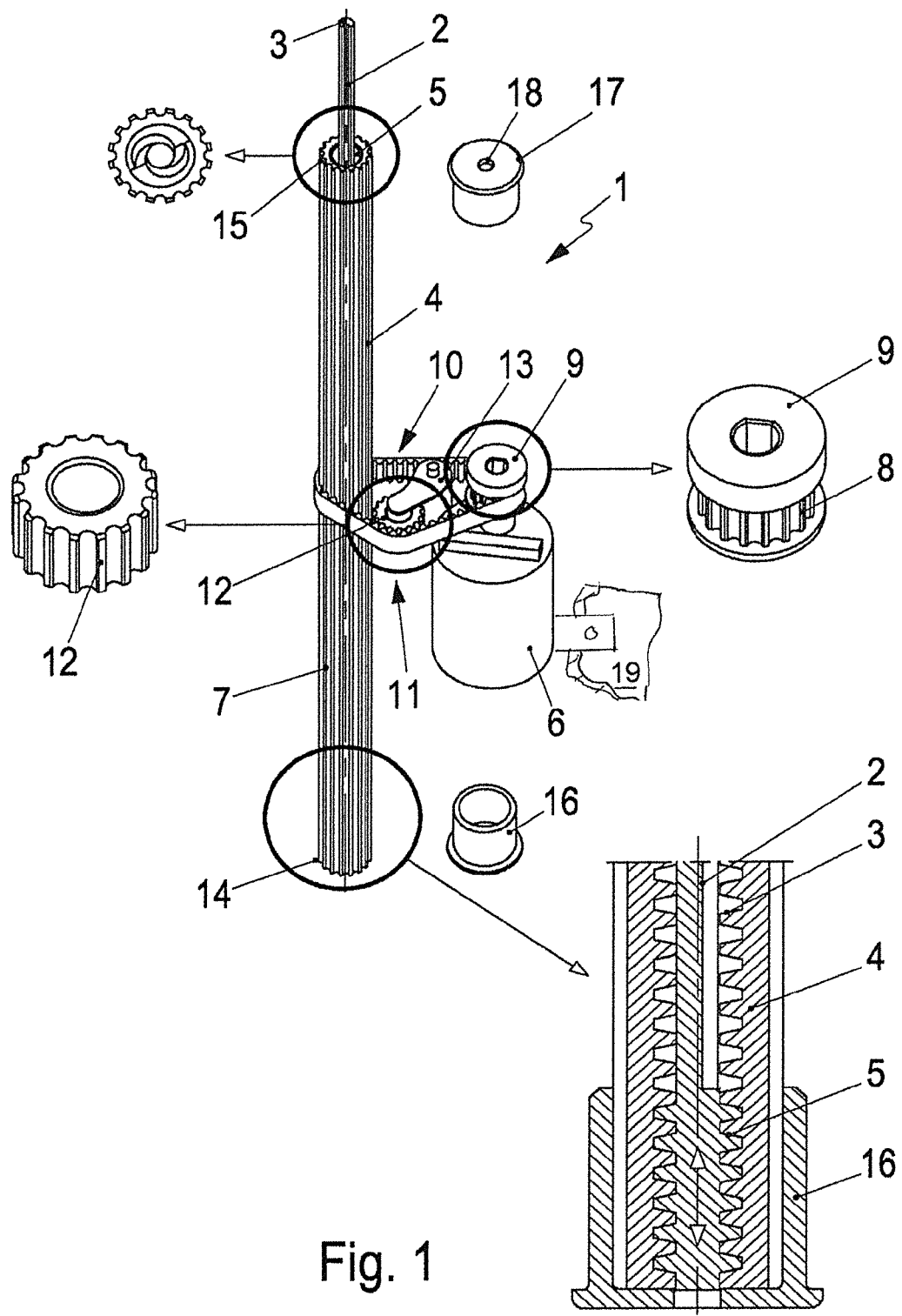
FIG. 1 is a schematic exploded view of a drive arrangement.

FIG. 1 is an exploded illustration of a drive arrangement 1 for actuating a roller sun blind of a motor vehicle. The drive arrangement 1 has an actuation rod 2 with an external thread 3 and a hollow cylinder 4 with an internal thread 5. The actuation rod 2 is arranged coaxially in the hollow cylinder 4. The external thread 3 of the actuation rod 2 meshes with the internal thread 5 of the hollow cylinder 4 so that relative rotation of actuation rod 2 and hollow cylinder 4 displaces the actuation rod 2 axially relative to the hollow cylinder 4. The external thread 3 and internal thread 5 may have a worm or screw thread.

The actuation rod 2 is guided non-rotatably relative to the roller sun blind toward the outside. In this case, however, the hollow cylinder 5 is rotated by a drive 6. Thus, the hollow cylinder 4 can rotate and move the actuation rod 2 out of the hollow cylinder 4 by a screw motion. The hollow cylinder 4 has an external toothing 7 for rotatably driving the hollow cylinder 4.

The drive 6 is an electric motor that cooperates with toothing 8 of a drive wheel 9 to drive the external toothing 7 of the hollow cylinder 4. The drive wheel 9 can drive the external toothing 7 directly or indirectly via a toothed belt.

In the illustrated embodiment, a toothed belt 10 loops around the toothing 7 of the hollow shaft 4 and also around the toothing 8 of the drive wheel 9 of the electric motor. A belt tensioner 11 with a roller 12 and a spring 13 also is provided. The spring 13 forces the roller 12 against the toothed belt 10.

Sleeves 16, 17 are provided at both end regions 14, 15 of the hollow shaft 4. The sleeves each engage around the hollow shaft 4 and partially receive the hollow shaft 4 so that the hollow shaft 4 can rotate in the sleeves 16, 17. At least one of the sleeves 16, 17 has an opening 18 through which the actuation rod can extend when it is deployed in the direction of the sleeve 17.

Figure 2:
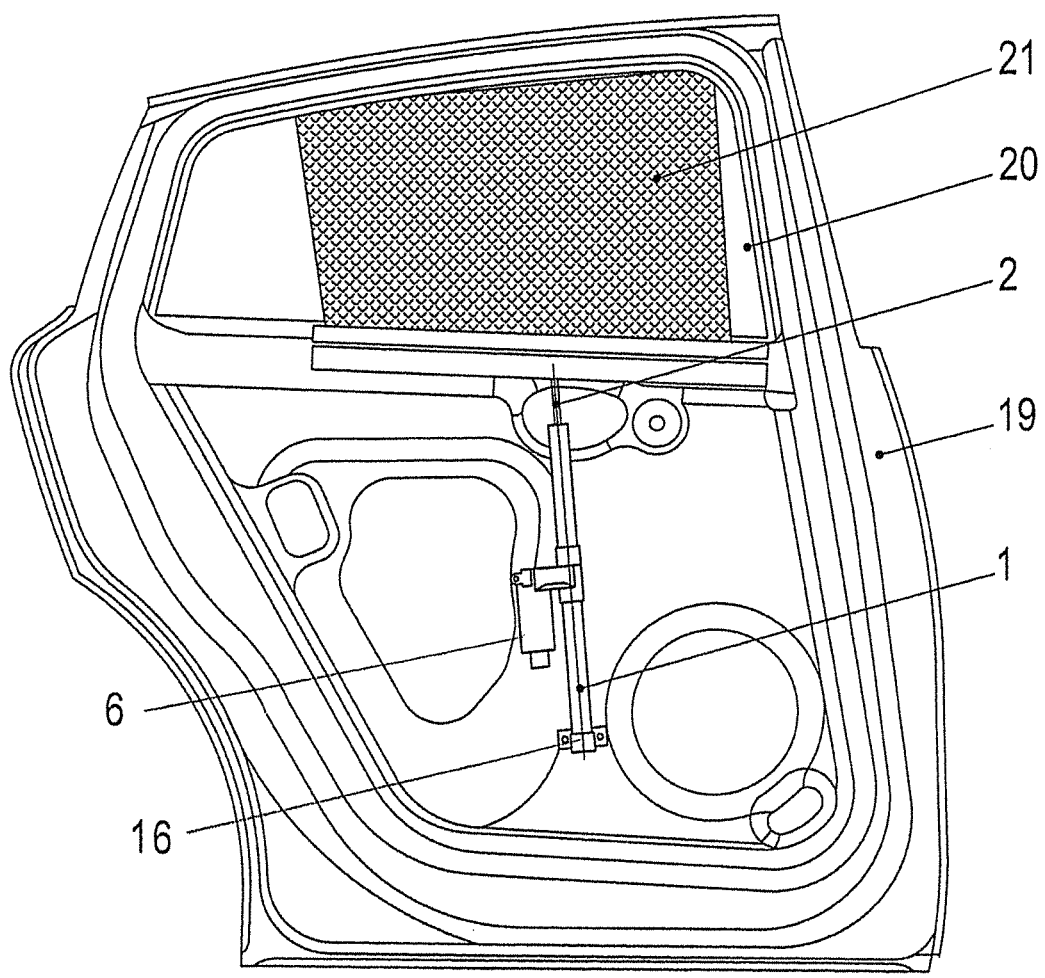
FIG. 2 is a schematic view of a drive arrangement in an arrangement in a vehicle door.

FIG. 2 shows the arrangement of the drive arrangement 1 in a door 19 of a motor vehicle. In the figure, a roller sun blind 21 is arranged in front of the window 20, and can be actuated to be raised and lowered in front of the window 20. The drive arrangement 1 is arranged below the window 20 and roller sun blind 21, and the actuation rod 2, when actuated, slides up and moves the roller sun blind 21 up. In this case, the actuation rod 2 follows the contour of the window, and preferably is flexible. For this purpose, the actuation rod 2 preferably is produced from spring steel.

LIST OF REFERENCE NUMERALS

1 Drive arrangement
2 Actuating rod
3 External thread
4 Hollow cylinder
5 External thread
6 Drive
7 External toothing
8 Toothing
9 Drive wheel
10 Toothed belt
11 Belt tensioner
12 Roller
13 Spring
14 End region
15 End region
16 Sleeve
17 Sleeve
18 Opening
19 Door
20 Window
21 Roller sun blind

What is claimed is:

1. A drive arrangement for actuating a roller sun blind of a motor vehicle, comprising:

an actuation rod with an upper end connected to the roller sun blind, a lower end opposite the upper end and an external thread disposed at least adjacent to the lower end;

a hollow cylinder with opposite upper and lower ends positioned below the roller sun blind, an internal thread and external toothing, the actuation rod being arranged coaxially in the hollow cylinder with the external thread of the actuation rod meshing with the internal thread of the hollow cylinder so that rotation of the hollow cylinder relative to the actuation rod displaces the actuation rod axially relative to the hollow cylinder so that the actuation rod is guided non-rotatably from a retracted position where the lower end of the actuation rod is in proximity to the lower end of the hollow cylinder to an extended position; and a drive engaged with the external toothing of the hollow cylinder so that the hollow cylinder is rotated by the drive for selectively moving the actuation rod relative to the hollow cylinder.

2. The drive arrangement of claim 1, wherein the drive comprises an electric motor that has a drive wheel with toothing, the drive drives the external toothing of the hollow cylinder.

3. The drive arrangement of claim 2, wherein a toothed belt loops around the toothing of the hollow cylinder and also around the toothing of the drive wheel of the electric motor.

4. The drive arrangement of claim 1, wherein at least one end region of the hollow cylinder is mounted rotatably in a sleeve.

5. The drive arrangement of claim 1, wherein end regions of the hollow cylinder are mounted rotatably by sleeves.

6. The drive arrangement of claim 5, wherein one of the sleeves has an opening through which the actuation rod extends.

7. The drive arrangement of claim 1, wherein the actuation rod is flexible.

8. The drive arrangement of claim 7, wherein the actuation rod is composed of spring steel.

* * * * *